June 22, 1943.     T. A. RYAN     2,322,665
CHILD'S FEEDING DISH
Filed April 22, 1940
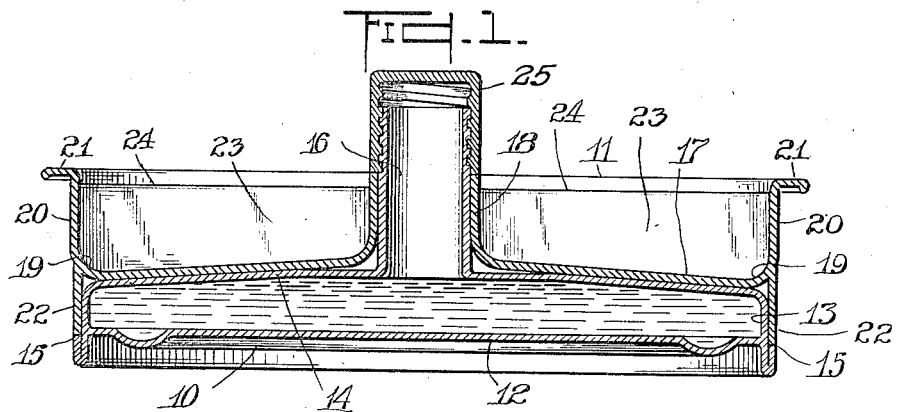
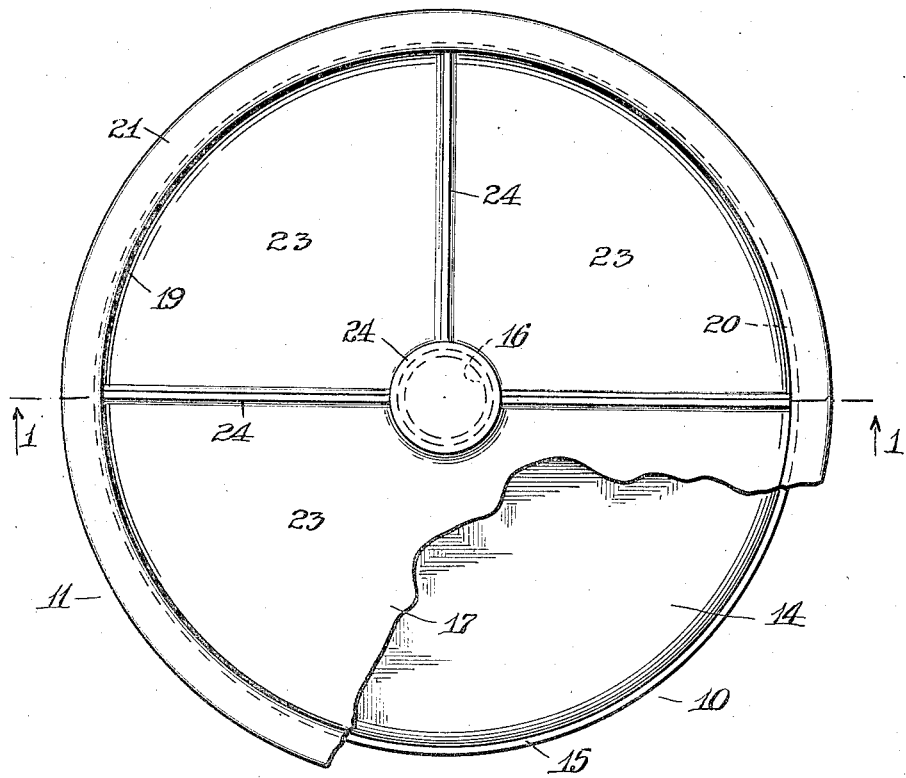
Thomas A. Ryan
INVENTOR
BY
his ATTORNEY Patented June 22, 1943

2,322,665

UNITED STATES PATENT OFFICE 2,322,665

CHILD'S FEEDING DISH

Thomas A. Ryan, Mount Vernon, N. Y., assignor to Zadek-Feldstein Co., Inc., New York, N. Y., a corporation of New York Application April 22, 1940, Serial No. 330,888

6 Claims. (Cl. 65—15)

This invention relates to a child's feeding dish and has reference particularly to improvements in a dish of this character which is provided with a separable compartment or receptacle adapted to contain liquid at a temperature at which the food in the dish should be maintained.

Dishes of this character have been devised which are composed of a single piece of metal or porcelain having an upper receptacle for the food and a lower compartment for hot water which transfers its heat to the food and maintains it for considerable time at the proper temperature. The cost involved in the production of a single piece dish of this character is particularly large and it is usually a cast article which requires relatively heavy walls and results in a dish of considerable weight.

With the foregoing in mind it is the principal object of the present invention to provide a dish and a separate supporting receptacle of relatively light weight materials, which will not sacrifice any of the sturdy qualities required of a child's dish of this character, but which will be possible to manufacture and sell at a cost very much lower than it has been possible to do in cast ware.

It is a further object of this invention to construct the liquid receptacle of a metal which is both light in weight and of maximum thermal conductivity and to combine with the metal receptacle a food dish which may be made of a plastic or similar non-breakable material of relatively thin gauge and of a vast assortment of colors and designs.

A still further object of my invention is to construct the food dish and its associated receptacle with means for securely attaching them together to form a single unit and to utilize the attaching means as a handle or grip whereby the unit may be carried.

I accomplish these objects by means of the embodiment of my invention hereinafter described, set forth in the appended claims and illustratively exemplified in the accompanying drawing, in which:

Figure 1 is a substantially longitudinal sectional view of the invention taken on lines 1—1 of Figure 2; and Figure 2 is a top plan view of the dish showing parts broken away to disclose the liquid receptacle.

Referring to the drawing, 10 denotes a hollow closed base receptacle to contain the hot or cold liquid and 11 an open dish which is supported upon the base 10.

The base 10 comprises preferably a round metal container having a bottom 12, side wall 13 and slightly arched top 14. The side wall 13 projects below the bottom 12 and is turned outwardly upon itself to form an outside peripheral shoulder 15 at substantially the elevation of the bottom 12. The center of the top 14 is provided with an opening and an upright tubular neck portion 16 which is externally threaded at its upper end, and which is used to admit and discharge the heating or cooling liquid.

The dish 11 comprises a bottom 17 having a profile to contact the surface of the top 14 and being provided with a central upstanding neck portion 18 to embrace the neck 16 and to project to the inner end of the threads thereof. The bottom 17 of the dish 11 at its periphery turns upwardly about a curve 19 and joins the upright side wall 20, which rises to the elevation of the upper end of the neck 18 and which is turned outwardly to form a lateral annular rim 21. Depending from the curve 19 and slightly inside the periphery of the wall 20 is a skirt or flange portion 22 which fits snugly over the side wall 13 of the container 10 and its lower end rests upon the shoulder 15. In the present form the dish 11 is subdivided into segmental compartments 23 by means of radially disposed walls 24 projecting from the neck 18 to the side wall 20.

The threaded end of the neck 16 projects above the neck 18 of the dish and receives a screw cap 25 which closes the opening into the base receptacle and engages the upper end of the neck 18 to hold the dish 11 and receptacle 10 together so as to maintain the top 14 of the latter in contact with the bottom 17 of the dish. The screw cap 25 is also intended for use as a handle by means of which the unit may be lifted and carried.

In use the hot or cold liquid is poured into the receptacle 10 through the neck 16 and the screw cap 25 is tightened against the neck 18 of the dish 11 which will retain its proper temperature because of the contact of the bottom 17 with the top 14 through which the temperature of the liquid is transferred. When the dish 11 is ready for washing, it is disconnected from the base 10 by simply removing the cap 25 and separating the two parts. While the cap 25 is off, the liquid may be drained off or the receptacle refilled.

Having now described my invention, what I claim and desire to secure by Letters Patent is:

1. The combination of a closed receptacle provided with an inlet and outlet spout and adapted to contain liquid and a separate open dish resting directly upon and in direct heat transferring contact with the receptacle and having a dependent skirt portion closely embracing the side of the receptacle.

2. The combination of a closed receptacle provided with an inlet and outlet spout and adapted to contain liquid provided with an exterior peripheral shoulder in its side wall, and a separate open dish resting directly upon and in direct heat transferring contact with the receptacle and having a depending skirt portion closely embracing the side of the receptacle and resting upon the shoulder thereof.

3. The combination of a closed receptacle having an exterior peripheral shoulder in its side wall, and an upright tubular neck projecting from the top, and a separate open dish resting directly upon and in heat transferring contact with said receptacle and having an upright neck to fit over and embrace the lower portion of said first neck, said dish having a depending skirt portion to fit over and embrace the side of the receptacle and rest upon the shoulder thereof, and a cap to close the first neck portion and engage the second neck to hold the receptacle and dish together and to form a handle whereby they may be lifted and carried.

4. The combination of a closed receptacle to contain liquid at required temperature having an upright central neck portion projecting from the top and a depending portion about the bottom of its side wall to form an external shoulder, and a separate open dish resting directly upon and in heat transferring contact with the receptacle and having a central upright neck portion to fit over the lower portion of the first neck, said dish being further provided with a depending skirt closely embracing the side of the receptacle and resting upon the shoulder thereof, and a cap to screw over the upper end of the first neck and to engage the second neck to hold the receptacle and dish together.

5. The combination claimed in claim 4, in which the open dish is provided with partitions to subdivide the same into a plurality of compartments.

6. The combination claimed in claim 4, in which the contacting bottom wall of the dish and top wall of the receptacle taper downwardly from the neck portions towards the side walls.

THOMAS A. RYAN.